United States Patent [19]
Gardner

[11] Patent Number: 5,749,599
[45] Date of Patent: May 12, 1998

[54] VEHICLE AIR BAG GUARD

[76] Inventor: Henry J. Gardner, 1002 Bayview Rd., Greenacres, Fla. 33463

[21] Appl. No.: 754,980

[22] Filed: Nov. 22, 1996

[51] Int. Cl.$^6$ .................................................. B60R 21/02
[52] U.S. Cl. .......................... 280/748; 280/751; 297/487; 297/256.15
[58] Field of Search ..................... 280/748, 751; 297/487, 256.15, 250.1; 182/196, 207

[56]  References Cited

U.S. PATENT DOCUMENTS

| 2,888,061 | 5/1959 | Berlin | 297/487 |
| 3,146,026 | 8/1964 | Berlin | 297/487 |
| 3,858,684 | 1/1975 | Goings | 182/207 |
| 4,376,470 | 3/1983 | Ashton | 182/207 |
| 4,448,283 | 5/1984 | Marques | 182/207 |
| 4,796,913 | 1/1989 | Amabile et al. | 280/751 |
| 5,332,292 | 7/1994 | Price et al. | 297/256.15 |
| 5,454,591 | 10/1995 | Mazur et al. | 280/735 |
| 5,468,047 | 11/1995 | Goor et al. | 297/250.1 |

*Primary Examiner*—Paul N. Dickson
*Attorney, Agent, or Firm*—McHale & Slavin

[57]  ABSTRACT

An air bag guard for children and infants having support posts and support bars that form a partial cage for placement over a child or infant for protection against air bag deployment. The air bag guard includes a strap for securing the guard in position with a first embodiment accommodating both forward and rearward facing child seats a second embodiment directed to forward facing children. Each embodiment is collapsible for ease of storage and includes straps for securing the guard in position with adjustments available to accommodate diverse floor positions as well as angular placement of seat backs.

17 Claims, 2 Drawing Sheets

VEHICLE AIR BAG GUARD

FIELD OF THE INVENTION

This invention is directed to the field of child safety and in particular, to an air bag guard for use in a vehicle to protect an infant or small child during air bag deployment.

BACKGROUND OF THE INVENTION

The advantages of the air bag restraint system is well established as being able to protect an adult in the event of an accident. Air bags employ pressurized gas capable of nearly instantaneously filling a flexible bag. The air bag operates as a cushion for an individual by securing the individual in a position so as to inhibit movement. The restraint has been known to save numerous lives making the air bag an industry standard for both drivers and passengers of a vehicle.

It is also well-known that every state has some type of law pertaining to the securement of a child in a vehicle, whether it be by use of a seatbelt or a child seat. In many instances, a child is required to be placed in a rearward facing manner under the belief that such a position will further protect the child during an accident. However, many such laws were implemented before the reality of air bags were known, in which the placement of a child in a rearward facing position can actually lead to injury should an air bag inflate. For instance, when an air bag inflates, the impact may cause the child seat to flip, in light of an acceleration which can exceed 200 mph, or a force of over 100 G's. The result is injury or death to the child, even if the air bag inflated due to a minor fender bender. In 1996, the rate of child deaths attributable to air bag deployment is one death per month. Statistics state that in four years the rate will be one death per week.

While numerous child and infant lives have been lost during air bag deployment, countless injuries are unreported. The deployment is known to snap the neck of a child, cause a child car seat to move into an unpredictable position, or cause any of a number of situations all of which are serious but unreported. This is most disheartening when air bag deployment is unnecessary, such as in the case of a minor accident.

U.S. Pat. No. 5,454,591 discloses a device in an attempt to address these problems by use of a device which senses the weight of an individual placed within a seating area. If the weight is less than a normal adult, a sensor prevents activation of the air bag. The problem with this invention is the need for electronic incorporation into the mechanics of the vehicle. In addition, should an adult be seated who does not weigh what a "normal adult" weighs, the air bag will be disabled and the adult will have no protection.

U.S. Pat. No. 5,474,327 discloses yet another air bag restraining system capable of distinguishing between an infant seat and an adult, and between a rearward facing and forward facing infant seat. This device incorporates a microprocessor to sense the weight placed upon the seat and determines how the seatbelts are attached for determination of air bag placement. This invention also requires incorporation into the mechanics of the vehicle making it impractical for existing vehicles.

U.S. Pat. No. 5,468,014 discloses a device which reacts to the fastening of the child's car seat for purposes of deactivating the air bag. The child seat is a specialty item requiring particular functions and is not feasible in existing cars having air bags already installed.

U.S. Pat. No. 5,468,047 discloses another child safety seat which includes a head and body protector configured in the shape of a bar that is placed along each side of the device. The bar deflects an air bag in an upward position should the bag deploy. This car seat is of a unique and special design, and again, does not accompany or address the need for protection of infants who do not sit in the specialty designed car seat.

Thus, what is lacking in the art is a device that protects a small child from air bag deployment, that is inexpensive to manufacture, adjustable to any type of vehicle without disabling of the air bag electronics, is easily stored and is movable from vehicle to vehicle.

SUMMARY OF THE INVENTION

The instant invention is an air bag guard for use in a vehicle. A first embodiment of the invention employs a pair of vertical support posts pivotally coupled to a pair of horizontal support bars that are positionable in relation to a vehicle seat so as to form a partial cage for protection of a child. The support posts are positioned in an upright position directly in front of the vehicle seat. The horizontal support bars are located along a top end of the vertical support posts and positioned in a substantially horizontal position. The guard is coupled to the seat back of the vehicle seat by use of a flexible strap so as to maintain a substantially horizontal plane. The support posts may be secured to the front of the vehicle seat by use of a flexible strap positioned between the vertical support posts and the front of the vehicle seat. Pivotal connection of the posts to the bars permits the air bag guard to be stored in a compact manner and in many instances, stored beneath the vehicle seat.

The support posts and the support bars are preferably independently adjustable. The adjustment allows the guard to be universal with the support posts adjusting to a car seat despite the depth of the foot well or need for angular positioning due to obstructions on the floor. The support bars adjust to the seat back despite the distance between the support posts and the seat back, further allowing a seat back to be placed at various tilt angles without effecting operation.

An alternative embodiment of the air bag guard consists of a pair of support posts having a bottom end coupled to a pair of horizontal support bars. In this embodiment, the horizontal support bars are positioned beneath a child's car seat for securement with the support posts which are positionable over the car seat and secured to the back of the vehicle car seat by use of the flexible strap.

The support posts in the second embodiment may also be made adjustable, allowing the device to accommodate various sized child seats. In addition, the support posts are preferably angular in shape so as to provide spacial distance for a child to inhibit air bag intrusion and provide a range of clearance for the child's benefit. Pivotal connection allows the air bag guard to be stored in a compact manner and in many instances, stored beneath the vehicle seat.

Thus, an objective of the instant invention is to provide an air bag guard for infants and small children to inhibit injury during air bag deployment, yet allow for air bag deployment to secure the guard in a position to further assist in restraining the child during an accident.

Yet another objective of the instant invention is to provide a low-cost collapsible air bag guard that can be moved from vehicle to vehicle with full adjustments to accommodate various seating arrangements, size of the child, and the child's car seat.

Yet still another objective of the instant invention is to provide an air bag guard that is collapsible for compact storage such as placement beneath an automobile seat.

Yet still another objective of the instant invention is to disclose an air bag guard that couples to the vehicle seat so as to prevent movement during minor accidents, whether or not the air bag is deployed, thereby maintaining the guard in position despite vehicle movement.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION

Figure 1:
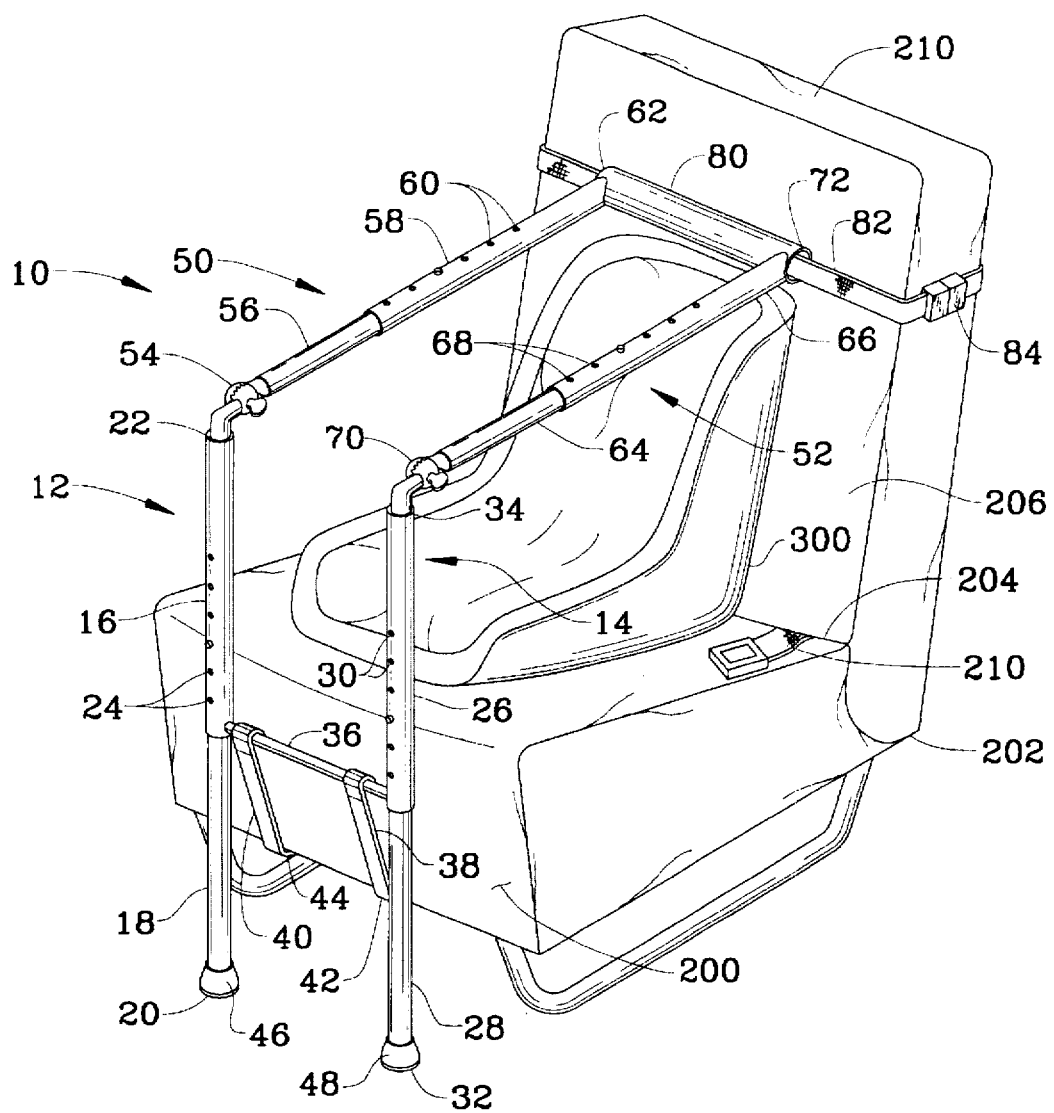
FIG. 1 is a pictorial view of an air bag guard of the first embodiment of the instant invention placed on a vehicle seat.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

Now referring to FIG. 1, set forth is a pictorial view of the first embodiment of the air bag guard 10 of the instant invention. The air bag guard includes a first vertical support post 12, and a second vertical support post 14. The first vertical support post consists of an upper portion 16 and a lower portion 18 providing an independently telescopically adjustable post wherein the upper portion has a larger diameter than the lower portion, allowing the lower portion to be slidably insertable into the upper portion for adjusting the height of the support post as measured between bottom end 20 and top end 22. The lower portion is secured to the upper portion by a locking means, such as a spring-loaded button secured to the lower portion which protrudes from one of the apertures 24 depicted along the upper portion. In this manner, the button is depressed, allowing the lower portion to be adjusted to the desired height, and by aligning the button with one of the apertures 24 which provides the locking mechanism, causing support post to be of fixed height. It is noted that the locking mechanism may be easily changed to a twist rod or any other mechanism that allows for the telescoping of such a post and such locking mechanisms are deemed within the scope of this invention.

Similarly, vertical support post 14 includes an upper portion 26 and lower portion 28, said lower portion slidably insertable into the upper portion. The upper portion including a plurality of apertures 30 for use in engaging a spring-loaded button mounted on said lower portion 28. The second vertical support post allows for an independent adjustment in relation to the first support post 12, wherein bottom end 32 and upper end 34 may be of a height so as to accommodate variances in the floor board of the vehicle, or any other obstruction that may cause a differential between the height of the first vertical support post 12 and the second vertical support post 14. Cross brace 36 maintains vertical support post 12 and 14 in a parallel spaced-apart position.

In the preferred embodiment, the cross brace is of a fixed distance, although it is contemplated that the cross brace is adjustable to accommodate unique seating positions and may be made removable to further allow for shipping and storage purposes. The vertical support post may be positioned directly in front of a vehicle seat 202 by use of adjustable attachment straps 38 and 40. Each attachment strap secured along one end to the support post or cross brace with a distal end 42 and 44 having a hook or a like attachment mechanism that secures the vertical support post in a fixed position. In this manner, the straps may also be directed to the middle of the car seat 204, wherein the strap may attach within the two adjoining sections of the seat back 206 and the seat 208. Additionally, the support post may be held in position by use of the seat belts 210, which may either wrap around the cross brace or an extension to a seatbelt may be secured to the cross brace or adjoining support post, so as to maintain the vertical support post in an upright position. The bottom end 20 and 32 of each support post includes a rubber or plastic grommet 46 and 48, providing a non-skid surface as well as prevent markings to the carpeting, should the adjustment straps 38 and 40 be overly tightened.

The air bag guard 10 is further supported by a pair of horizontal support bars 50 and 52. Horizontal support bar 50 has a first end 54 pivotally coupled to the top end 22 of vertical support post 12. The horizontal support bar 50 having a front section 56 and a back section 58 wherein said front section 56 is slidably insertable into back section 58. The tubular shaped members allow for the telescopably sliding within each other for adjustability. As with the vertical support post, the back section includes a plurality of apertures 60 which allow for the insertion of a spring-loaded button mounted on the front section 56, allowing for the fixed adjustment allowing the length as determined between the distance between first end 54 and second end 62 to be adjusted in length to accommodate the particular seating arrangement. Horizontal support bar 52 includes a front section 64 and a back section 66 wherein the front section is slidably insertable into the back section with the apertures 68 available for insertion of a spring-loaded button located on front portion 64. The front end 70 of the second horizontal support bar 52 is pivotally coupled to the top end 34 of vertical support post 14. The distance between the first end 70 and second end 72 is adjustable in length as well as angular direction as allowed by the pivot connection and the telescoping ability. The pivot 54 and 70 is preferably a locking pivot that allows for frictional engagement at the coupling once an angular position has been determined.

The horizontal support bars are preferably maintained in a spaced-apart parallel position by use of a cross brace 80 positioned between ends 62 and 72. The cross brace is secured in a similar manner to vertical support post cross brace 36. Cross brace 80 may be collapsible or removable for purposes of shipping and storage. The angular position of the horizontal support bars in relation to the vertical support posts are maintained by use of strapping means 82, which is placed through an aperture of the cross support 80 and wrapped around the seat back 206 of seat 202, preventing movement of the support bars during regular vehicle movement as well as for positioning from air bag deployment. Alternatively, a strapping means may be placed over the top 210 of seat back 206, again with the intent of maintaining the ends 62 and 72 against the seat back 206 in a secure position. It is noted that an air bag may impact the front of the support post 12 and 14 and a force of over 100 G's wherein the cross brace and ends 62 and 72 must distribute the force to the seat back 206. For this reason, the horizontal support bars are preferably positioned horizontally in relation to top ends 22 and 34 of the vertical support posts 12 and 14. Child seat 300 is depicted beneath the air bag guard for positioning of a child in either a frontward or rearward facing position. It is noted that the height of the vertical support posts allow an individual to adjust the guard for placement of various sized child seats as well as positioning said child seat in a rearward or frontward position as required by both the seat design, as well as local state law. Strap 82 includes buckle 84 or the like attachment mechanism so as to secure the strap in position during use.

Figure 2:
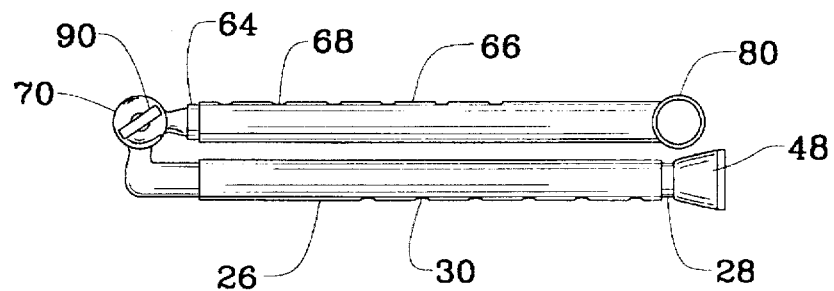
FIG. 2 is a side view of the air bag guard of the first embodiment placed in a storage position.

Now referring to FIG. 2, set forth is a side view of the air bag guard 10 depicted in FIG. 1, wherein the air bag guard 10 is placed in a folded storage position. In this manner, vertical support post upper portion 26 has received lower portion 28, wherein the push-bottom locking mechanism is depressed and placed to the forward most aperture 30 allowing for a compact storage position. Similarly, horizontal support bar 66 has the front portion 64 fully inserted into back portion 66 by depressing of the locking button, allowing for the slidable insertion into a compact storage position. Cross brace 80 and end cap 48 are depicted in a position adjacent to the entry point for the telescoping portions. Coupling joint 70 has allowed for the collapse of the support post and support bars and the use of locking wing nut 90 maintains the storage position. Straps may be wrapped around the support post, maintaining the post and bars in a fixed position should the locking nut 90 be eliminated.

Figure 3:
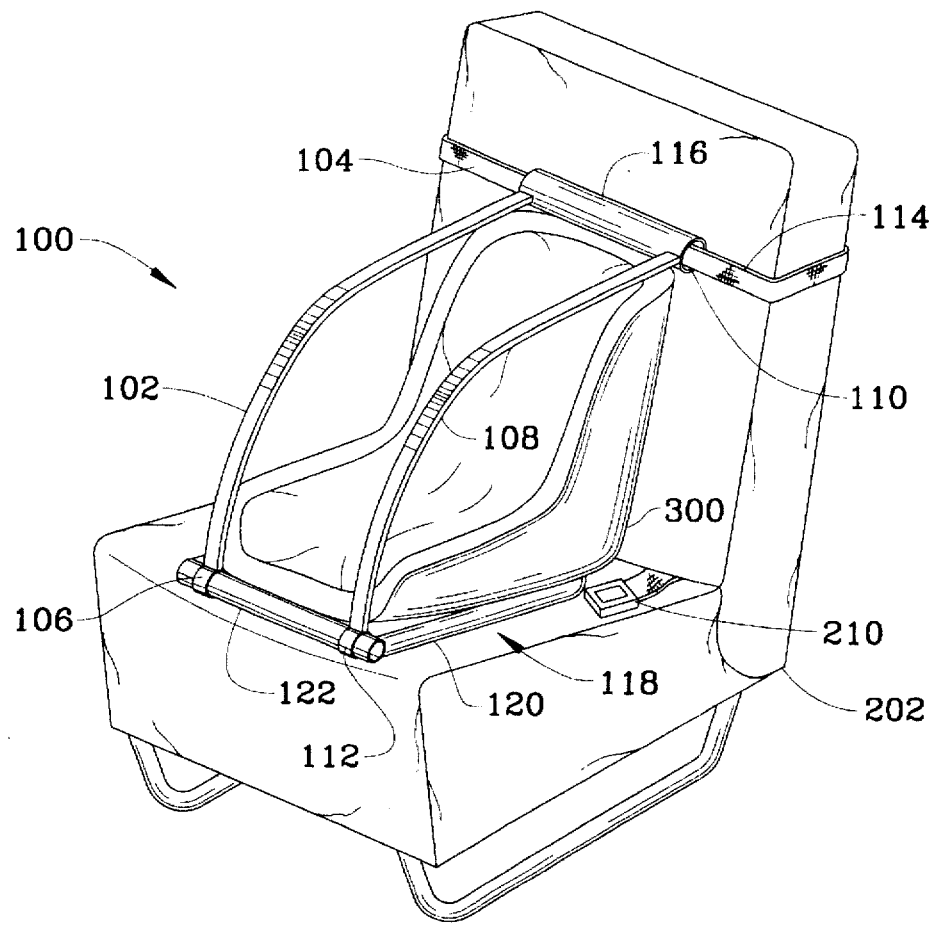
FIG. 3 is a pictorial view of an air bag guard of the second embodiment of the instant invention placed on a vehicle seat.

Now referring to FIG. 3, set forth is a pictorial view of the second embodiment of the instant invention. In this embodiment, the air bag guard 100 comprises a first support post 102 having a top end 104 and a bottom end 106. The support post is preferably curvature in shape and may also include a telescoping slidably insertable shaft as set forth in the first embodiment, although for purposes of clarity, this embodiment is shown as a single unitary support shaft on a support post. Similarly, a second support post 108, having a top end 110 and a bottom end 112 creates a curvature cage that is secured to the vehicle seat 202 by use of a strap 114 which secures to top ends 104 and 110 in a similar manner as the first embodiment by use of a cross brace 116 allowing the strap 114 to be inserted through an aperture located along the top end of each support post. The strap 114 maintains the support post in a position during normal vehicle movement. The bottom end 106 and 112 of the air bag guard may be fixed or pivotally coupled to a pair of horizontal support bars 118. A first horizontal support bar 120 is depicted in a fixed position to the support post 108, wherein the weight of child seat 300 maintains the lower end of the air bag guard in a fixed position. The horizontal support bars include a cross brace 122 to maintain the support posts 102 and 108 in a spaced-apart parallel position. In addition, a cross brace, not shown, may be placed at the distal end of each horizontal support bar which would allow further securement to the seat by coupling to seatbelt 210.

Figure 4:
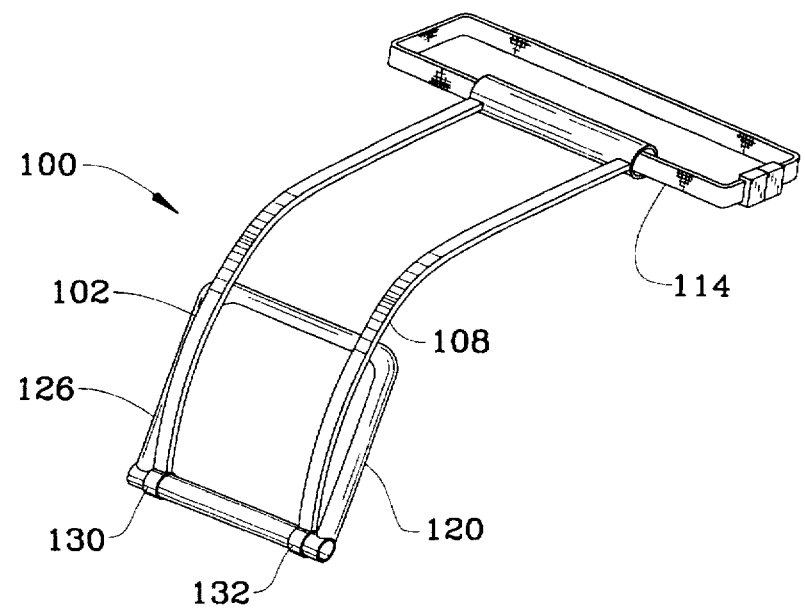
FIG. 4 is a side view of the air bag guard of the second embodiment placed in a storage position.

Now referring to FIG. 4, set forth is an alternative embodiment to the air bag guard described in FIG. 3, wherein the support posts 108 and 102 are secured to horizontal support bars 120, 126 by the use of pivot couplings 130 and 132. The air bag guard depicted is in a semi-collapsed position, wherein couplings 130 and 132 have allowed for the storage by placement of the bars 126 and 120 in a position adjacent to posts 108 and 102. As with the first embodiment, the couplings may include a locking mechanism which assists in maintaining the device in a stored position as well as assist in operation, so as to accompany strap 114 for support of the support posts in a proper position over the child seat. It should be noted that the posts and bars may be padded with foam or the like cushion material.

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What is claimed is:

1. An air bag guard for a vehicle for use in protecting a child during the inflation of a vehicle air bag, said air bag guard comprising:

a pair of adjustable vertical support posts, each support post having a top end and a bottom end;

a pair of horizontal support bars having a first end and a second end, said first ends coupled to said top ends of said support posts;

at least one flexible strap for securing said vertical support posts to a vehicle seat; and at least one cross brace for maintaining said vertical support posts in a spaced apart position;

whereby said apparatus is positioned in the front passenger seat of a vehicle by placement of said vertical support posts in an upright position directly in front of said passenger seat with said second ends of said horizontal support bars positioned against the seat back of said vehicle passenger seat wherein said air bag guard forms a cage for placement over a child to prevent air bag deployment from impacting a child seating on said passenger seat.

2. The air bag guard according to claim 1 wherein each said support bar is independently adjustable in length.

3. The air bag guard according to claim 1 including a flexible strap for coupling said support bars to a vehicle seat.

4. An air bag guard for a vehicle for use in protecting a child during the inflation of a vehicle air bag, said air bag guard comprising:

a pair of tubular shaped vertical support posts, each support post having a top end and a bottom end and a means for adjusting the overall length of each support post;

a pair of tubular shaped horizontal support bars having a first end and a second end, said first ends pivotedly coupled to said top ends of said support posts and a means for adjusting the overall length of each support post;

at least one cross brace for maintaining said vertical support posts in a spaced apart position;

a flexible strap for coupling said support bars to a vehicle seat;

whereby said apparatus is positioned in the front passenger seat of a vehicle by placement of said vertical support posts in an upright position directly in front of said passenger seat with said second ends of said horizontal support bars positioned against the seat back of said vehicle passenger seat wherein said air bag guard forms a cage for placement over a child to prevent air bag deployment from impacting a child seating on said passenger seat.

5. The air bag guard according to claim 4 wherein each said support post is independently telescopically adjustable, a first section of each support post having a length and a diameter size so that a second section of each support post having a length and a smaller diameter than said first section will fit slidably therein allowing for an adjustment in height through the extension or contraction of the first section in relation to said second section, said first section and said second section locked in position by an interlocking means.

6. The air bag guard according to claim 4 wherein each said support bar is independently telescopically adjustable, a first section of each support bar having a length and a diameter size so that a second section of each support bar having a length and a smaller diameter than said first section will fit slidably therein allowing for an adjustment in overall length, said first section and said second section locked in position by an inter locking means.

7. The air bag guard according to claim 4 including a means for coupling said vertical support posts to a vehicle seat.

8. The air bag guard according to claim 4 wherein said means for adjusting is further defined as a spring loaded button operatively associated with said posts and said bars, whereby said button means is depressed and a smaller diametric part of said posts and said bars is inserted into a larger diametric part of a corresponding post and bar and said parts releasably interlock when said button means springs forward upon encountering and penetrating an aperture.

9. The air bag guard according to claim 3 including a padding to encompass at least a portion of said guard.

10. An air bag guard for a vehicle for use in protecting a child during the inflation of a vehicle air bag, said air bag guard comprising:

a pair of support posts, each support post having a top end and a bottom end;

a pair of horizontal support bars, each support bar having a first end and a second end, said first ends coupled to said top ends respectively;

whereby said horizontal support bars are positionable beneath a child's car seat and said support posts are positionable over said child's car seat wherein said air bag guard provides a cage to prevent contact between air bag deployment and the child.

11. The air bag guard according to claim 10 including at least one cross brace for maintaining said support posts in a spaced apart position.

12. The air bag guard according to claim 10 wherein said support posts are independently adjustable, a first section of each support post having a length and a diameter size so that a second section of each support post having a length and a smaller diameter than said first section will fit slidably therein allowing for an adjustment in height through the extension or contraction of the first section in relation to said second section, said first section and said second section being lockable.

13. The air bag guard according to claim 8 including a means for coupling said support bars to the back support of a vehicle seat.

14. An air bag guard for a vehicle for use in protecting a child during the inflation of a vehicle air bag, said air bag guard comprising:

a pair of tubular shaped vertical support posts, said support posts each having a top end and a bottom end;

a pair of tubular horizontal support bars, each support bar having a first end and a second end, said first end pivotedly coupled to said bottom end of each support post;

at least one cross brace for maintaining said vertical support posts in a spaced apart condition;

a means for coupling said support bars to the back support of a vehicle seat;

whereby said horizontal support bars are positionable beneath a child's car seat and said support posts are positioned over said child's car seat wherein said air bag guard provides a cage to prevent contact between air bag deployment and the child.

15. The air bag guard according to claim 12 wherein said support posts are independently telescopically adjustable, a first section of each support post having a length and a diameter size so that a second section of each support post having a length and a smaller diameter than said first section will fit slidably therein allowing for an adjustment in height through the extension or contraction of the first section in relation to said second section, said first section and said second section having interlocking means.

16. The air bag guard according to claim 13 wherein said interlocking means includes a spring loaded button means in the second section and said first section includes apertures, whereby said button means is depressed and said second section is inserted into said first section and said sections releasably interlock when said button means springs forward upon encountering and penetrating one of said apertures.

17. The air bag guard according to claim 13 including a padding to encompass at least a portion of said guard.

* * * * *